United States Patent [19]
Chan et al.

[11] 3,980,836
[45] Sept. 14, 1976

[54] TOLL RESTRICTING METHOD AND APPARATUS

[75] Inventors: Richard Lik-Chuen Chan, New York, N.Y.; Ove Villadsen, Wall, N.J.

[73] Assignees: International Components Corporation; TIE/Communications, Inc., both of Stamford, Conn.

[22] Filed: May 5, 1975

[21] Appl. No.: 574,474

[52] U.S. Cl. ............................................. 179/18 DA
[51] Int. Cl.² ........................................... H04M 1/66
[58] Field of Search ............................... 179/18 DA

[56] References Cited
UNITED STATES PATENTS

| | | | |
|---|---|---|---|
| 3,851,109 | 11/1974 | Downs et al. | 179/18 DA |
| 3,872,260 | 3/1975 | Oatis | 179/18 DA |
| 3,899,640 | 8/1975 | Pieacente et al. | 179/18 DA |

*Primary Examiner*—William C. Cooper
*Attorney, Agent, or Firm*—Kenyon & Kenyon

[57] ABSTRACT

The invention is a toll restricting method and apparatus which restricts toll telephone calls from telephone stations by interrupting dialing sequences if from the station there is dialed (a) a restricted digit during a first predetermined number of digits, or (b) more than a second predetermined number of digits. Restricted dialing sequences are interrupted by disconnecting the telephone from the central office line for a period sufficient to release all the registered digits and to return central office dial tone to the telephone. Also provided are a method and apparatus for allowing absorb digits to be dialed before the counting of digits begins. A method and apparatus are additionally provided for restricting a telephone from which delays between digits dialed are greater than a predetermined time delay.

22 Claims, 8 Drawing Figures

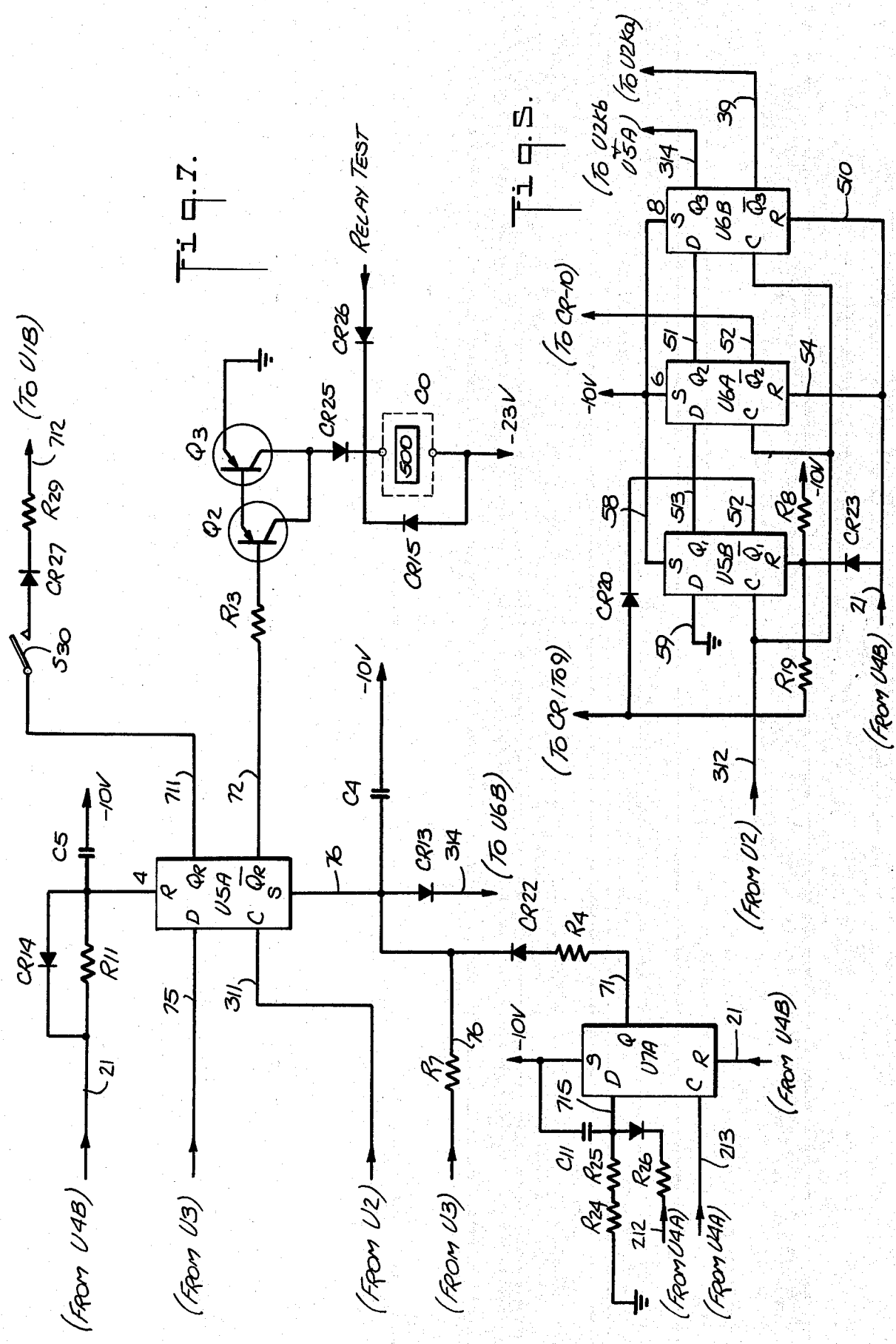

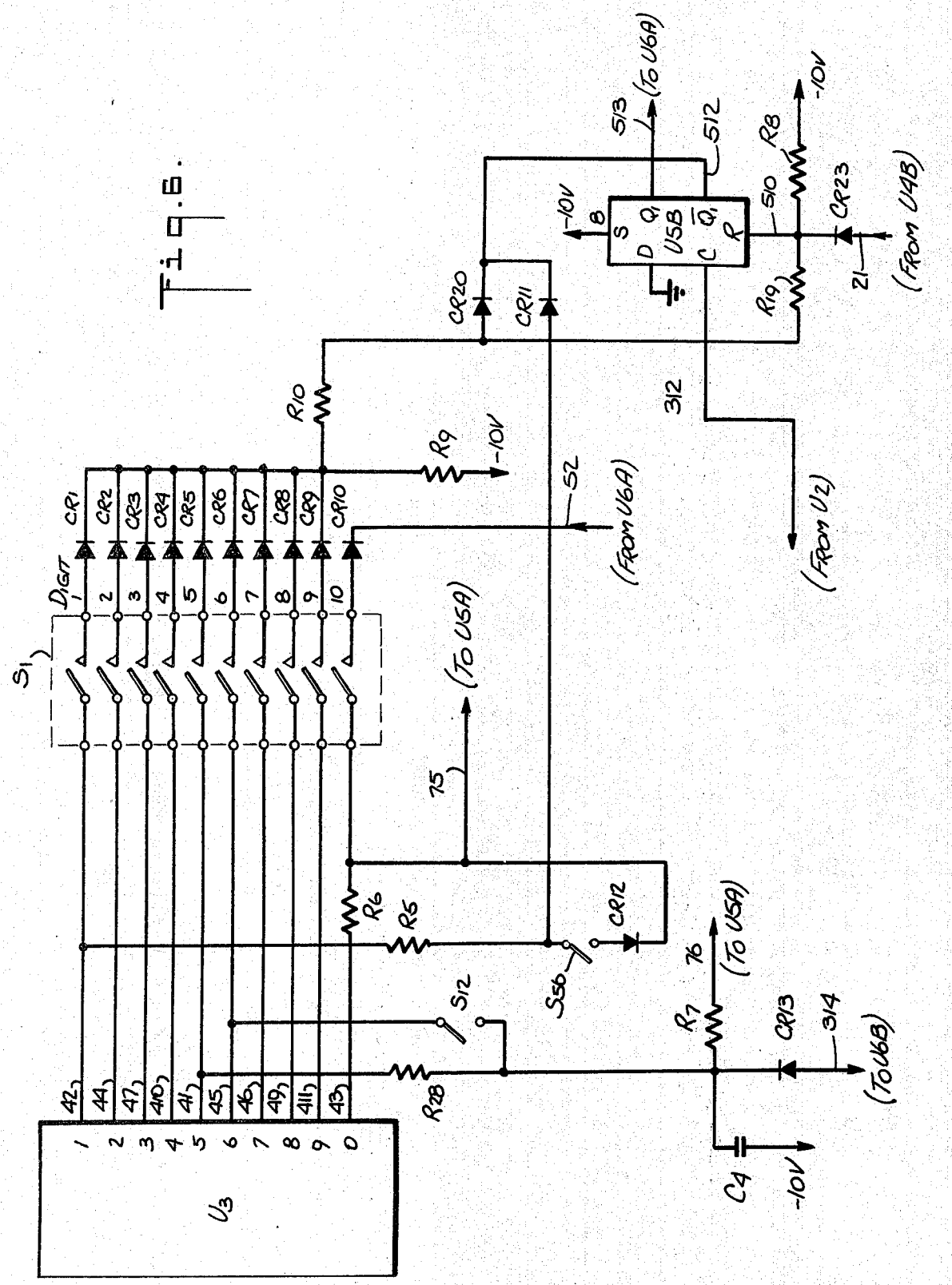

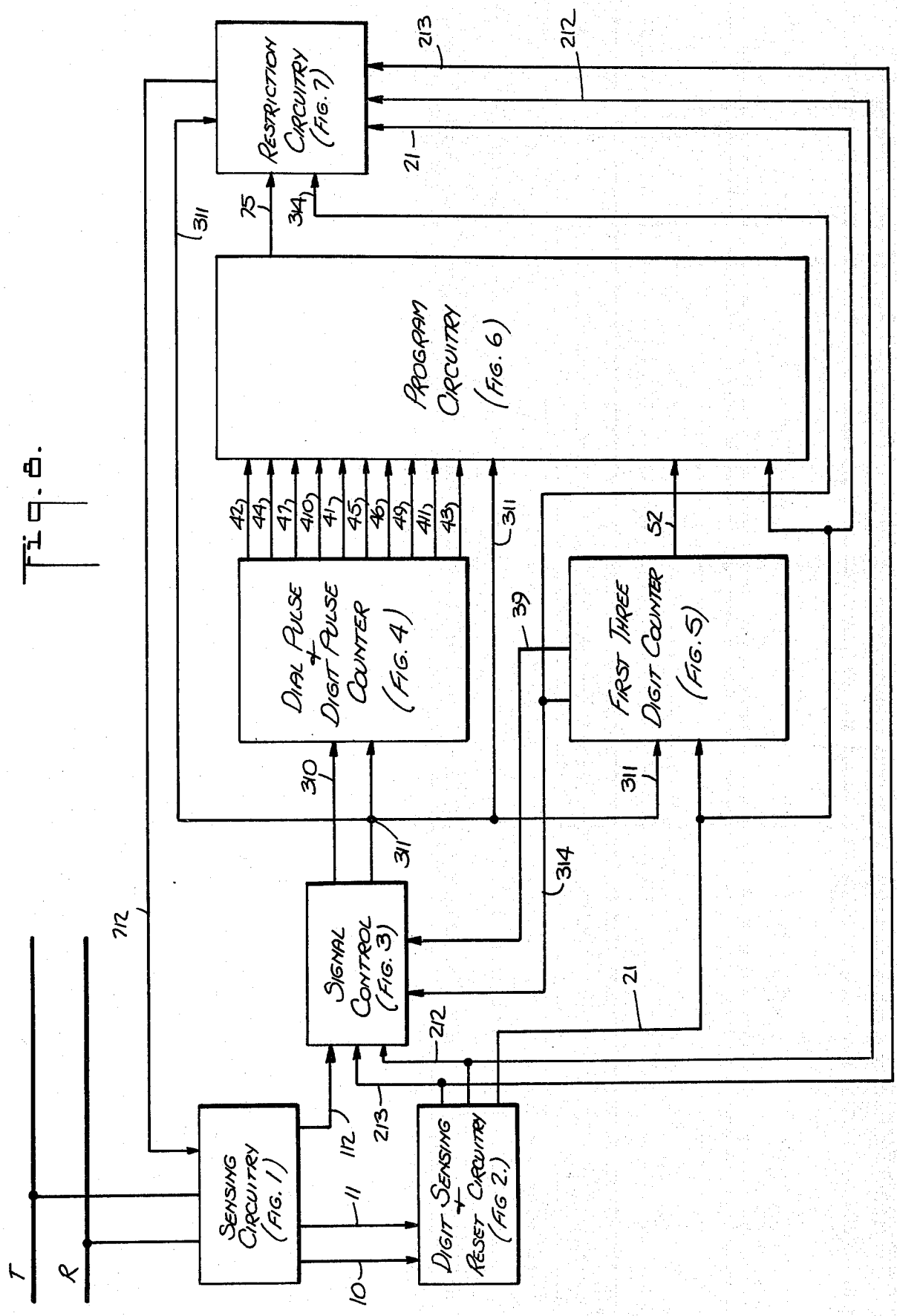

TOLL RESTRICTING METHOD AND APPARATUS

BACKGROUND OF THE INVENTION

1. Field of the Invention

The invention relates to telephony in general and in particular to toll restrictor circuits preventing a telephone set user from making toll telephone calls from a rotary-dial telephone set, or similar instrument providing loop disconnect outputs compatible with rotary-dial service.

2. Description of the Prior Art

By dialing ten digits, including the area code and a telephone number, a user of a telephone set in the United States can be connected to almost any other telephone set in the United States and Canada without obtaining operator assistance. Of course, the user can obtain operator assistance in completing a toll call simply by dialing the digit "0" and verbally asking the operator to complete the call. Because it is easy to use the telephone network to make expensive long-distance toll calls, it is useful for some telephone subscribers to assure that long-distance telephone calls cannot be made from certain telephone sets. This is particularly true in business offices or motels, hotels, etc. which have one trunk line to a central office of the telephone company to which are connected multiple station sets.

Telephone sets in use in the United States use two different signaling or dialing means: loop disconnect dialing apparatus, and tone dialing apparatus. Tone dialing apparatus uses frequency signaling and is not the subject of this invention and will not be discussed herein. The invention is directed for use with loop disconnect dialing apparatus.

Telephone sets with rotary dials generate dial pulses at the nominal rate of 10 pulses per second regardless of the digit dialed; the number of dial pulses generated corresponds to the digit number, e.g. one pulse is generated for the digit "1", two for "2", etc., with ten pulses being generated for the digit "0".

Toll restriction circuits are known in the prior art. Some circuits operate on the principle that the resistance of the line connected to the central office is different when a local exchange is dialed, than when a long distance call is to be made. By measuring the resistance of the line, means have been devised to block the call thereafter. U.S. Pat. Nos. 3,201,523 and 3,488,221 present circuits and equipment based on this principle, but they have inherent disadvantages because of the variation of resistances of telephone circuits due to of such factors as differences of distance to central offices different equipment in different central offices, etc.

A more straight forward approach is based on the fact that certain dialing digits must be dialed in order for a telephone user to be able to make a long distance call. By sensing those digits means can be provided for disconnecting the telephone. U.S. Pat. No. 3,566,042 discloses one such means, an electro-mechanical device for counting dial pulses and means for interrupting the line from the telephone set to the central office. An electro-mechanical approach to the toll restriction problem suffers from disadvantages of slow speed, high cost, and inherent relative accuracy.

U.S. Pat. No. 3,692,951 shows digital electronic toll restriction means in which each individual area code or access number must be individually programmed for restriction. This circuit has the inherent disadvantage of not having flexibility to restrict calls on the basis of the number of digits dialed, or capability to restrict all calls starting with "zero" or with zero among the first three digits.

For many multiple subscriber telephone situations, it is necessary to first dial "9" to obtain access to the central office. For those applications toll calls could be made by dialing 9 and then zero. Obviously, to make a valid local call requires 9 plus seven more digits, 8 digits in total. Total digit dialing in excess of eight digits would indicate that a toll call is being attempted.

For telephone sets which require no digit to be dialed to obtain central office dial tone, toll calls can be detected by detecting that a zero has been dialed as the first digit or detecting calls having more than seven digits.

Service calls, such as information "411" and emergency calls, such as "911" are usually not restricted. When the information operator hangs up, the caller could dial the operator by dialing 0, and make a long distance call, while the toll restrictor counted neither a 0 in the first three digits nor more than seven or eight digits called.

In some parts of the country, certain digits are merely "absorbed" by the central office. The digits are not used for call signaling, but merely for central office information purposes, i.e., billing etc. Hence there are situations where a user could dial the absorb digits and then 0 defeating the 0 restriction on the first digits dialed and the total number of digits dialed as indications of toll calls being made.

In addition to the dialing characteristics which must be considered in a toll restrictor circuit for general use, it is desirable that the circuit operate independently from the telephone signaling system applied at the central office. It is also desirable that the circuit make use of modern digital technology employing commercially available integrated circuits to perform functions previously performed by analog circuits and discrete digital components.

It is therefore a primary object of this invention to provide a digital, toll restrictor circuit suitable for use with loop disconnect dialing subscriber telephone stations.

It is another object of this invention to provide a toll restrictor circuit which functions independently of any telephone network d.c. signaling system or network protection device.

It is another object of this invention to provide a toll restrictor circuit which requires no special polarity and which is connected in parallel and which presents at least 1 Mohm resistance with the telephone line.

It is another object of this invention to provide a toll restrictor circuit which disregards the dialing of one or more absorb digits.

It is another object of this invention to provide a toll restrictor circuit designed with integrated circuits which can be manually programmed to provide any or all of the following features:

restriction for digit 0 dialed in the first two or the first three digits dialed;

restriction for digit 1 dialed in the first digit;

restriction for digits dialed in excess of seven or eight digits; and restriction when delays between digits dialed are greater than a predetermined time delay.

SUMMARY OF THE INVENTION

In order to satisfy these objectives, sense circuitry is provided responsive to ON-HOOK and OFF-HOOK and dial pulse signaling information present at the tip and ring lines connecting a telephone set to a central office. Set and reset circuitry is provided to set logic circuits when a user takes the telephone "OFF" HOOK and to reset them when the telephone goes "ON" HOOK, or when restriction takes place. A signal control circuit is provided which passes dialing pulses to a counter circuit during the time the first three digits of a telephone call are dialed, and which sends digit pulses to the counter thereafter.

During dial pulse counting, if a zero is dialed, the counter sends a signal to a logic circuit which operates a relay which opens the tip and ring circuit long enough to provide a new dial tone from the central office. During digit counting, the counter sends a signal to the restriction logic circuit if more than seven (or more than eight, depending on switch settings) digits are counted, whereupon the restriction logic opens the relay in the tip and ring circuit again providing dial tone to the user.

Circuitry is provided to detect "absorb" digits during dial pulse counting. Absorb digits are those digits which are disregarded at the central office. The circuitry can be set to account for any digit from 1 through 9. If an absorb digit is sensed, the signal control circuit is not advanced to the ordinary condition after a non-absorb digit is dialed. Hence the toll restrictor circuit is in the same state as if no digit at all had been dialed.

The Toll Restrictor is programmable to allow transfer of a toll call from an unrestricted subscriber subset. If it is not so programmed, the restricted subset(s) will be unable to access a toll call placed by an unrestricted subscriber, as the trunk cut-off relay, with "break" contacts in series with the line, will stay operated for the duration of the call.

Circuitry is also provided to prevent the user from reaching the operator by dialing 0 upon receipt of second dial tone; this is accomplished by measuring the inter-digital time; e.g. if the time between dialed digits exceeds a certain maximum, the toll restrictor will restrict, regardless of whether or not the other conditions are met.

BRIEF DESCRIPTION OF THE DRAWINGS

FIG. 5 shows counting logic for the first three digit pulses used in the toll restrictor circuit.

FIG. 6 shows programming circuitry used in the toll restrictor circuit.

FIG. 7 shows the restriction circuitry used in the toll restrictor circuit.

FIG. 8 shows how the circuits of FIGS. 1–7 are interconnected to make up the entire toll restrictor circuit.

DESCRIPTION OF THE INVENTION

Sensing Circuitry

Figure 1:
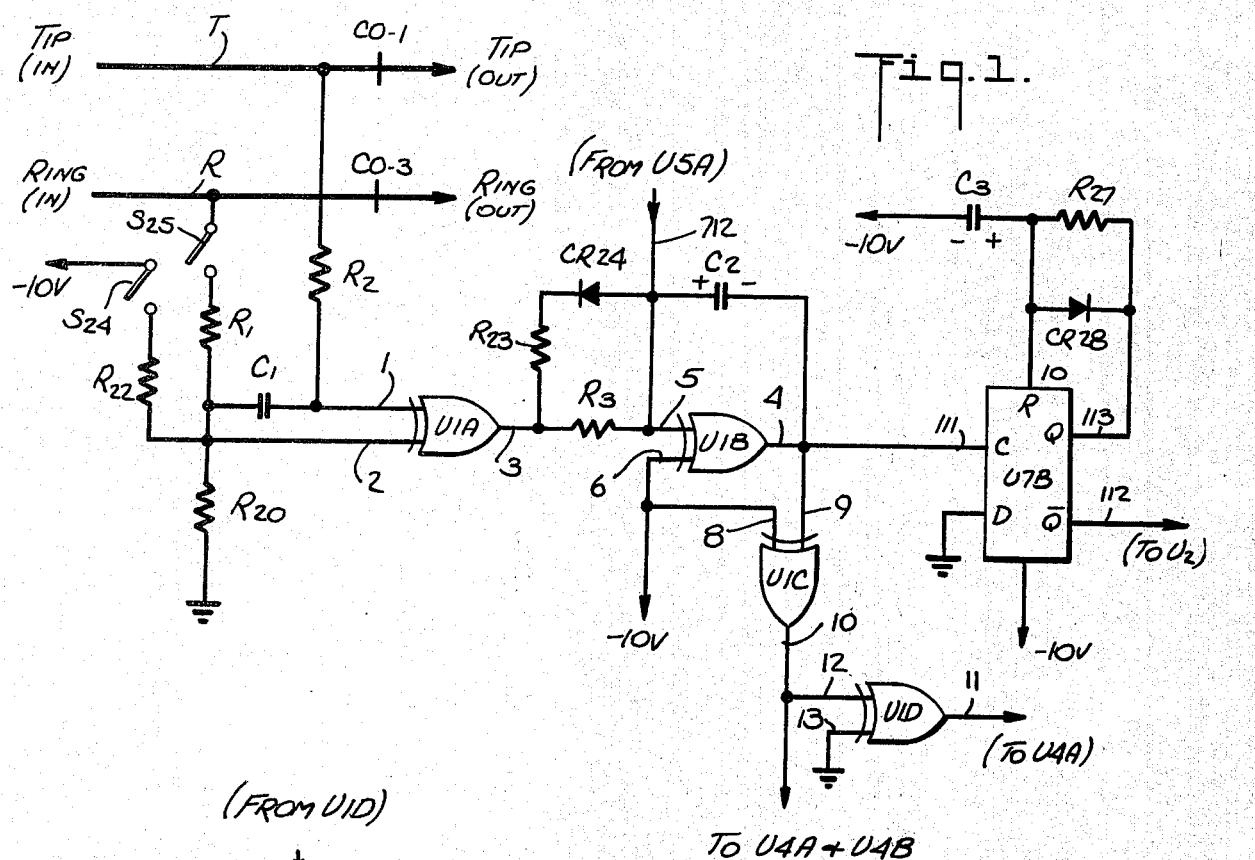
FIG. 1 shows a circuit diagram of sense circuitry used in the toll restrictor circuit.

FIG. 1 shows the sense circuitry for the toll restrictor. The Exclusive-OR circuits labeled U1A, U1B, U1C, and U1D are all located on one C-MOS integrated circuit. A preferred commercial supply of these Exclusive-OR circuits is the CD4030AE manufactured by RCA and described in the RCA Solid State '74 Databook Series SSD-203B. This book can be obtained from RCA Solid State, Box 3200, Somerville, N.J., U.S.A., 08876. Other integrated circuits described below are also described in the RCA Databook.

Input leads 1 and 2 of Exclusive-OR circuit U1A are connected respectively to the "tip" and "ring" lines T, R of a telephone circuit through resistors $R_1$ and $R_2$. Capacitor $C_1$ is shunted across inputs 1 and 2. $R_1$, $R_2$ combined with $C_1$ provide very high shunting impedance (more than 1 meg-ohm) to the lines T and R, and present no imbalance loading to the lines. Also, $R_1$ and $R_2$ and $C_1$ provide a current limiting and noise suppressing function for input leads 1 and 2. Capacitor $C_1$ serves to dampen any momentary high voltage transient on lines T and R. The dampened and low current transient is again clamped by the internal, integrated protecting arrangements of U1A as the final protection of the Exclusive-OR device. Capacitor $C_1$ also serves to neutralize a.c. noises which would otherwise appear on lines 1 and 2.

The circuit described herein uses logic such that a logical 1 is at ground or "high" level. Logical 0 is at minus ten volts or at "low" level.

During dialing, the telephone line is momentarily opened a number of times corresponding to the digit dialed. These actions in the line generate dial pulses on lines T and R, and are sensed by lines 1 and 2, converted to logic pulses, and output at line 3.

The sensing circuit logic decisions for Exclusive-OR circuit U1A are as follows:

| Line Condition | (TIP) line 1 | (RING) line 2 | (OUTPUT) line 3 |
|---|---|---|---|
| ON-HOOK | 1 | 0 | 1 |
| OFF-HOOK | 0 | 0 | 0 |
| Dialing | 0/1 | 0 | 0/1 |
| Transient | 1 | 1 | 0 |

The 0/1 designation in the above table indicates that during dialing, the logic changes state from low to high a number of times corresponding to the digit dialed and then back to low.

The logic outputs on line 3 provide the necessary sensing information for all subsequent logic decisions. For the ON-HOOK condition, Exclusive-OR circuit U1A generates a long duration (greater than 400 ms) logic 1 for reset purposes. At OFF-HOOK, line 3 is driven low to enable the entire toll restrictor circuit. During dialing, line 3 is impressed with positive pulses, the number of which corresponds to the digit dialed. The duration of the positive going pulse during dialing is not long enough to cause reset. If a transient should occur on the line (i.e. both T and R are at 1) or open circuit, line 3 is set to 0 because U1A is an Exclusive-OR circuit. Thus, all possible conditions from start to completion of dialing are clearly defined by U1A and its input circuitry.

The logic pulse generated on line 3 is again verified by U1B and its associated components $R_3$, $R_{23}$, $CR_{24}$, and $C_2$. Resistor $R_3$ and Capacitor $C_2$ control the charging time. If a positive pulse on line 3 is longer than 21 ms, it will trigger Exclusive-OR circuit U1B to yield an output pulse on line 4. Capacitor $C_2$ is also used as the positive feedback path to produce a Schmitt trigger action. Diode $CR_{24}$, resistors $R_{23}$ and $R_3$ and capacitor $C_2$ control the discharge time at about 7 ms. By this arrangement, only the positive duration of a pulse is checked.

The pulses on line 4 are applied to two inputs. Exclusive-OR circuit U1C buffers the outputs applied on line 9 via line 10 to a subsequent circuit (U4A) for digit pulse generation. Line 111 of circuit U7B receives line 4 signals as clock inputs. Circuit U7B is used as a monostable vibrator triggered at the positive edge of an input clock from line 4 via line 111. Circuit U7B is a RCA CD4013AE dual D-type flip-flop circuit. When U7B is triggered, line 113 will go high. In turn, it charges capacitor $C_3$ through resistor $R_{27}$. At about 47 ms, capacitor $C_3$ is charged up to the threshold level of the reset of U7B, and resets line 113 to low level. Thus, U7B generates on line 113 a positive pulse about 47 ms wide whenever U7B is triggered. Line 112 of U7B is identical to line 113 except opposite in polarity, and it is used as clock for counter U2, which will be subsequently described. As described, the monostable pulse generation of U7B is used for pulse conditioning. This arrangement is necessary because telephone lines have high inductance and will, therefore, produce high voltage transients during the make and break transitions. These transients are usually dampened by arcquencher circuits. The dampening action, however, can provide a momentary conduction. This conduction can cause dial pulse distortions the shapes of which are unpredictable. Circuit U7B triggers about 21 ms after the occurrence of a dial pulse and blanks out for about 47 ms. The summation of time durations is about 68 ms covering the whole duration of a dial pulse break period, which is about 60 ms nominal. Thus, the blanking action prevents double pulse generation from a single distorted dial pulse.

Switch $S_{25}$ shown in FIG. 1 is closed when the line (tip and ring) is connected directly to the central office without the use of a Network Protection Device (NPD). When the line is isolated from the central office by an NPD, $S_{24}$ is closed and $S_{25}$ is opened. When an NPD is in the line it is necessary to terminate one lead (line 2) of the sensing circuit to a fixed low level ($-10V$ d.c.) instead of to the ring lead.

Digit Sensing and Reset Sensing

Figure 2:
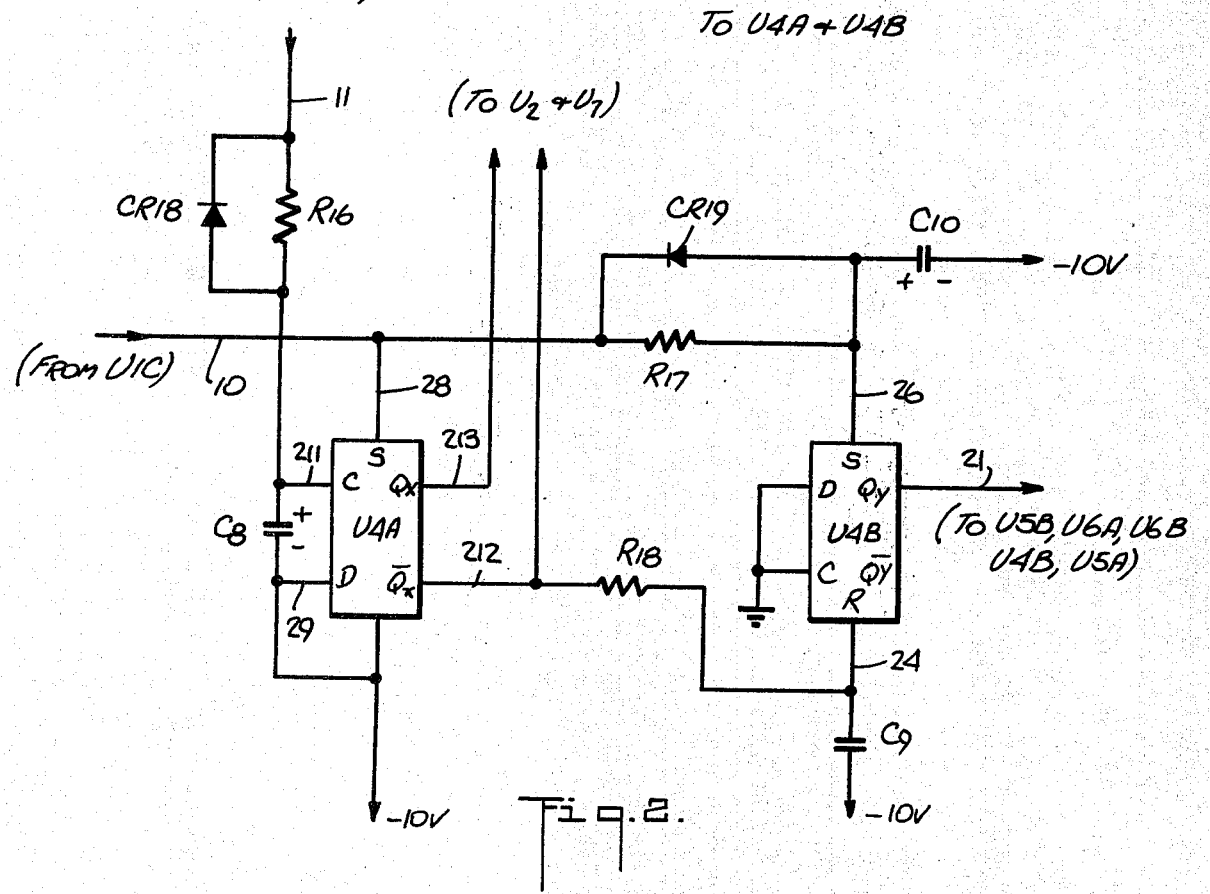
FIG. 2 shows a circuit diagram of digit sensing and reset sensing circuitry used in the toll restrictor circuit.

FIG. 2 shows two integrated circuits labeled U4A and U4B. Circuit U4A is a D-type flip-flop used as a digit pulse generator. Circuit U4B is a D-type flip-flop used as a reset generator. These circuits are commercially available on one integrated circuit, the RCA CD4013AE.

When a valid positive pulse is sensed by circuit U1B (FIG. 1), circuit U1C buffers it and sends it to inverter U1D. Line 10 from U1C is connected to U4B on line 26 via resistor $R_{17}$. Line 10 from U1C is also connected to U4A on line 28.

When line 28 connected to U4A receives a positive pulse, line 213 output from U4A is set to logical 1 and line 212 output from U4A is set to logical 0, starting the digit pulse. When line 212 is low, (0) it removes reset from flip-flop U4B via line 24 through resistor R18 and capacitor $C_9$ in about 6 ms. Thus, when U4A is set, U4B also becomes active.

Meanwhile, inverter U1D (FIG. 1) sends a negative pulse through a diode $CR_{18}$ to line 211 of U4A (FIG. 2). This pulse impresses a logical 0 on line 211 of U4A. At the end of a positive pulse line 11 of U1D goes high, starting to charge capacitor C8 through resistor $R_{16}$. After about 250 ms of stable high voltage at line 11, $C_8$ is charged such that line 211 is at the threshold level for flip-flop U4A. The normal 40 ms make-time of a dial pulse is not long enough to trigger U4A. Only the interdigital interval of minimum 300 ms is long enough to trigger U4A. Since line 29 is connected to a low level ($-10^V$ or 0), line 213 of U4A will be triggered to a low level and line 212 will be triggered to a high level. Whenever U4A triggers, the end of a digit is signified. Line 213 is connected to control inputs of circuit U2 which will be subsequently discussed.

The positive pulse from line 10 (from U1C (FIG. 1)) applied on line 28 is also applied to line 26 of U4B via resistor $R_{17}$. Resistor $R_{17}$ and capacitor $C_{10}$ have a time constant of about 470 ms. A 60 ms break pulse is not long enough to charge $C_{10}$ to a sufficient positive voltage on line 26 to trigger flip-flop U4B. At the end of the positive dialing pulse, the charges accumulated at line 26 (on the capacitor $C_{10}$) will be discharged rapidly through diode $CR_{19}$ to line 10. There is no charge accumulation from dialing pulse to dialing pulse. During the ON-HOOK condition line 10 is stable at logical 1 for longer than 70 ms and U4B is triggered. The output of U4B on line 21 then goes high to logical 1 resetting all subsequent logics to the initial conditions.

Thus it can be seen that U4A and U4B respond to positive going pulses. Flip-flop U4A responds to any positive pulse, but U4B responds only to long duration positive pulses.

Signal Control

Figure 3:
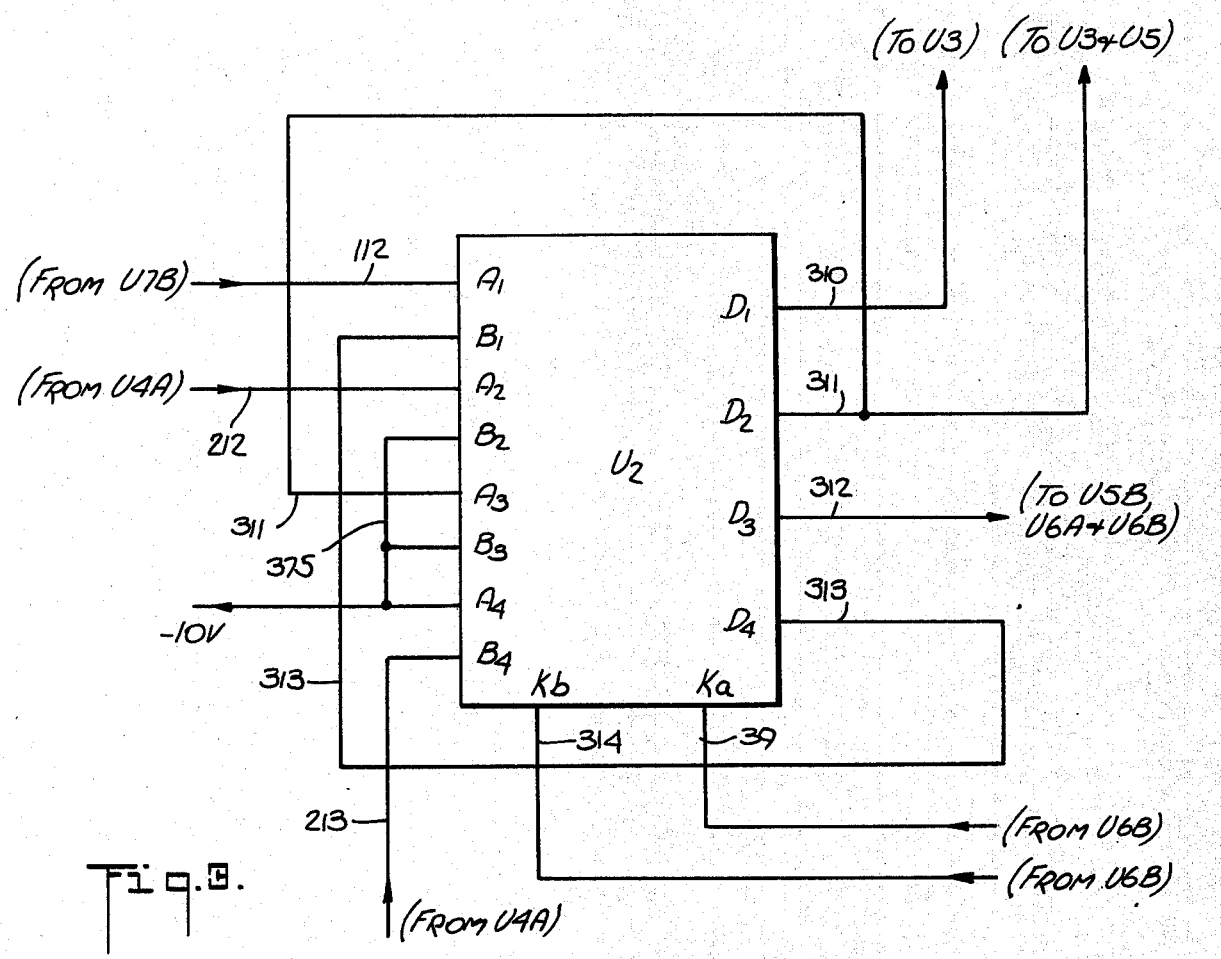
FIG. 3 shows signal control circuitry used in the toll restrictor circuit.

FIG. 3 shows a circuit, U2, having two-input select gates $K_a$ and $K_b$ for distributing signals to all vital control points. The selection gates are used to switch the outputs from one group of input signals to other input signals after the third valid digit has been dialed.

Before the third valid digit is dialed, the line 39 is high enabling the $K_a$ input of U2 which in turn enables all A inputs, $A_1$, $A_2$, $A_3$ and $A_4$. Whatever inputs appear on the B inputs ($B_1$, $B_2$, $B_3$, $B_4$) are disregarded when $K_a$ is high. The $A_1$ input is connected to line 112 which is output from circuit U7B (FIG. 1). Dial pulses from line 112 are gated out on line 310. Line 310 is connected to the clock input of a counter circuit, U3, which will be discussed subsequently, for dial pulse counting.

The $A_2$ receives negative-going digit pulses from circuit U4A (FIG. 2) via line 212. The output line 311, distributes the digit pulses to a restriction register U5, which will be subsequently discussed. In addition, line 311 applies negative-going digit pulses to the reset input of decate counter U3 (FIG. 4) to enable counting of dialing pulses. Counter U3 is reset at the end of each digit. Line 311 from the $D_2$ output of U2 is applied to $A_3$ at the input of U2. U2 buffers the pulses appearing at $A_3$ and delays them by means of an internal gate. The slightly delayed negative-going digit pulses from line 312 are applied to the clock inputs of U5B, U6A, and U6B (FIG. 5). Input $A_4$ of U2 is permanently tied to $-10$ volts. Thus, output line 313 is a logical 0 during the dialing of the first three digits.

After the first three valid digits are dialed (non-restrictive and non-absorption digits), the $K_a$ input is driven low by line 39, thereby disabling all A inputs.

Simultaneously, $K_b$ input is driven high by line 314 which enables all B inputs.

Input $B_4$ receives digit pulses from line 213 of circuits U4A. Circuit U2 buffers these pulses and outputs them on line 313 where they are applied to the $B_1$ input of U2. The pulses are then output on line 310 sending digit pulses to counter U3 for digit counts.

Because the $B_2$ input is permanently applied with −10 volts via line 375, the output line 311 is always at logical 0 or at low level after the third digit is dialed. This low level continuously enables the counter U3 for digit counting.

Input $B_3$ of U2 is also permanently applied with −10 volts via line 376. As a result, no clock pulses are sent via output line 312 to registers U5B, U6A and U6B.

Counting

Figure 4:
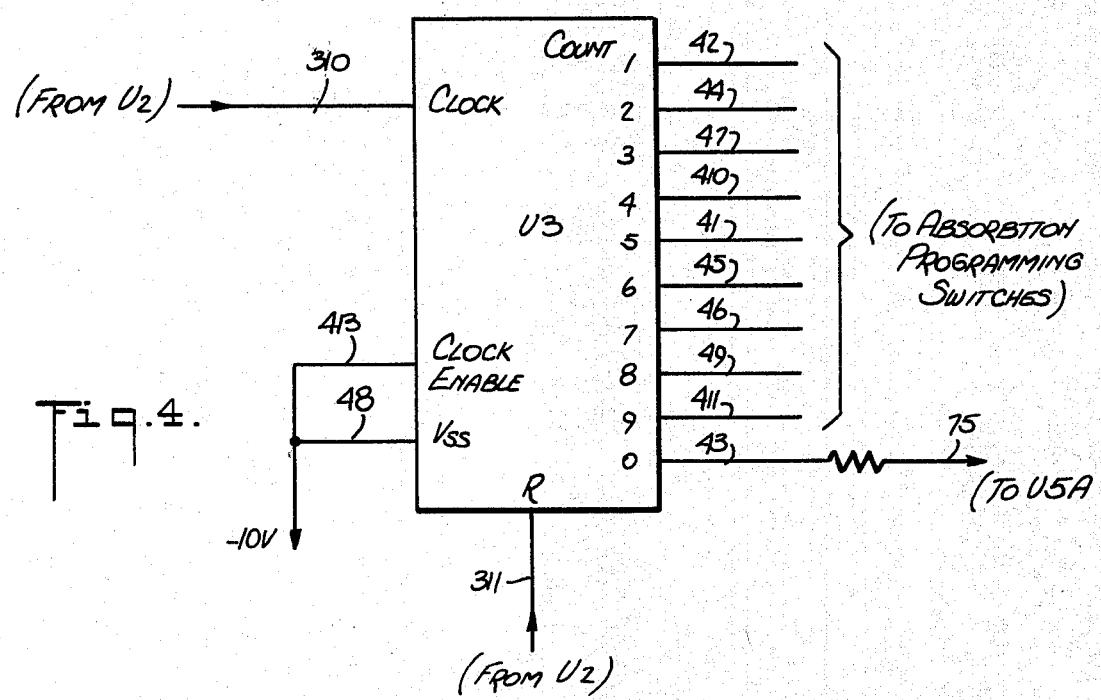
FIG. 4 shows counting circuitry used in the toll restrictor circuit.

FIG. 4 shows an integrated circuit labeled U3 which is a decade counter used for dial pulse counting for the first three digits and used for digit pulse counting after the third valid digit. Counter U3 is commercially available as the RCA CD4017AE integrated circuit. The reset input of U3 labeled R is controlled by the negative-going digit pulse on line 311. Until the pulse is sent via line 311, R is always reset. When the digit pulse does arrive on line 311, counter U3 is enabled to count dial pulses. The input labeled "clock" receives negative-going digit pulses from line 310 after three valid digits have been dialed which are output from control circuit U2 (FIG. 3). The trailing edges of the clock pulses advance the counter.

Until three valid digits have been dialed, U3 receives dial pulses on line 310. During the counting of dial pulses, the output lines on the output of U3 are energized with a pulse according to the number of dial pulses counted. For example if a digit 9 is dialed, the counter U3 will energize the output 9 on line 411 and continue to energize it until a digit pulse is removed from line 311, and the reset input R is returned to a high level. Dial pulse counting only occurs during the first three valid digits.

Valid digits are non-restricted digits and nonabsorb digits. FIG. 5 is the part of the entire toll restrictor circuit which counts the first three valid digits. Circuit U5B is a D-type flip-flop used to indicate that a first valid digit has been dialed. Circuit U6A is a D-type flip-flop used to indicate that a second valid digit has been dialed. Circuit U6B is a D-type flip-flop used to indicate that a third valid digit has been dialed. Each of these flip-flops are commercially available RCA 4013AE integrated circuits.

Circuits U5B, U6A and U6B are connected to form a three-stage shift register. When a valid digit is dialed, circuit U5B is triggered by the trailing edge of the digit pulse arriving on line 312 from circuit U2. Meanwhile counter U3 is counting dial pulses and a programmed matrix of switches (to be discussed subsequently) is used to generate signals responsive to restricted digits.

After the trailing edge of the third valid digit pulse, the outputs of U6B on lines 314 and 39 force control circuit U2 (FIG. 3) to select B inputs. When "B" inputs are selected, line 311 to counter U3 (FIG. 4) will keep the reset input R of U3 at a low or logical 0. Thereafter circuit U3 counts digit pulses input on line 310 through circuit U2 from line 213 of U4A (FIG. 2).

Thus, the valid digit counting and dial-pulse counting of each digit are processed in parallel during the first three digits. Thereafter only digit counting is performed.

Programming

FIG. 6 shows 10 position switches used to program the toll-restrictor circuit for absorption and restriction digits. Portions of U3 (FIG. 4) and U5B (FIG. 6) are repeated here on FIG. 6 to explain their function when a restricted or absorb digit is dialed.

Swtiches S1-1 through S1-9 are used for absorption programming. Switch S1-10 is used for the first two digit 0 restriction. Absorption digits are programmed by closing the switch numbered corresponding to the absorption digit, i.e. S1-4 is closed if 4 is an absorption digit. If a digit programmed for absorption is dialed as the first digit the high level or logical 1 output of U3 corresponding to the digit dialed will be applied through the closed switch contact through the diode matrix of CR1 through CR9 and to the load resistor $R_9$. The logical 1 pulse is also applied through $R_{10}$ and $R_{19}$ to line 510 at the reset input of flip-flop U5B. This reset pulse on U5B inhibits U5B from registering the first digit on line 312 from circuit U2. At the end of the digit pulse U3 is reset as explained previously, and the junction point of the diode matrix and $R_9$ goes low, allowing flip-flop U5B to be enabled again. The absorption digit or digits can be repeated indefinitely so long as no valid digit or restricted digit is dialed, whereby flip-flop U5B is never triggered, and the circuit is always at the initial stage.

If a first valid digit is dialed, U5B will register the digit. Line 512 goes low. Line 510 now is kept low through $R_{19}$ and $CR_{20}$. If the second digit dialed is an absorbed digit, the high level will be transferred through the closed switch contact, the diode matrix, through resistor R10 and arrive at resistor $R_{19}$. Diode $CR_{20}$, however, brings the junction of resistor $R_{10}$ and resistor $R_{19}$ to low level. Resistor $R_{19}$ is not allowed to pass any high level signal to the reset input on line 510. Therefore, absorption does not occur after a valid digit has been dialed.

Switch S1-10 is used to program for restriction of digit 0 in the first two or the first three digits dialed. With switch S1-10 closed, digit 0 restriction takes place in the first two digits only. After the second valid digit is dialed, flip-flop U6A (FIG. 5) line 52 is driven low (logical 0). Line 52 is connected through diode $CR_{10}$ (FIG. 6), thence through the closed switch S1-10 to flip-flop U5A via line 75. Flip-flop U5A (FIG. 7) serves as the restriction circuit to be subsequently discussed. If the third digit dialed is a 0 the high level from U3 on line 43 will have no effect on the restriction flip-flop U5A because line 75 is clamped at low voltage from line 52 of flip-flop U6A. Restriction, therefore will not take place. If switch S1-10 is open, restriction of the third digit will occur.

Switch 12 is used for programming 9th-digit restriction. If switch 12 is closed and line 41 is low, the restriction-set-line 76 of flip-flop U5A will be held low until the 9th digit is dialed. If the switch 12 is open, the high level from the 8th digit will pass $R_{28}$ and $R_7$ and set U5A at U5-6 for restriction. The restriction-set-line 76 of U5A (FIG. 7), however, is disabled during the first three digits from flip-flop U6B line 314 through diode $CR_{13}$. Line 314 of U6B stays low until the trailing edge of the third digit pulse arrives. Therefore, high levels on U3 output lines 41 or 45 will have no influence during the first three digits.

Restriction

FIG. 7 includes a flip-flop U5A which is a D-type flip-flop used for restriction logic, and U7A a D-type flip-flop for time-out restriction. Both U5A and U7A can be commercially realized with RCA CD4013AE flip-flops. Transistors $Q_2$ and $Q_3$ are used as a power amplifier to control relay CO which is a trunk cut-off relay for opening the line.

Flip-flop U5A is the nerve center of the toll restrictor. Line 75 manipulates restriction possibilities until three valid digits have been dialed. Digit pulses are applied on line 311 to the C input of U5A during each of the first three valid digits dialed. After the third digit is dialed, there are no further digit pulses applied on line 311, and there is no longer restriction data manipulation.

Line 76, connected to the set input of U5A, is not activated until the third digit has been dialed. Diode $CR_{13}$ holds the set input low until the third stage register (U6B) is triggered by the third digit pulse. From the third digit on the set-line is activated. When line 41 or 45 of U3 is then at logical 1 indicating that an 8th or 9th digit has been dialed, line 76 will be set for restriction.

Digit One Restriction

After counter U3 (FIG. 6) counts one pulse indicating that a 1 has been dialed and line 42 is set to logical 1. The high level is applied through $R_5$ and closed switch $S_{56}$ through diode $CR_{12}$ to line 75 where it is applied to the D input of U5A (FIG. 7). This logical 1 state remains on line 75 and U5A is triggered for restriction at the trailing edge of the digit pulse arriving on line 311. When flip-flop U5A is triggered, line 72 is set to a low logical state, 0, turning on the PNP-Darlington connected amplifier comprising transistors $Q_2$ and $Q_3$. When the amplifier is turned on, relay CO is energized and contacts in the telephone line are opened to force an ON-HOOK condition. All circuits are then reset to their initial state and transistors $Q_2$ and $Q_3$ are turned off thereby releasing the relay CO.

Digit 0 Restriction

During dial pulse counting, if a 0 is dialed, counter U3 sets line 43 to a high level. This voltage is impressed across $R_6$ and is applied on line 75 of U5A. When the trailing edge of the digit pulse arrives on line 311, flip-flop U5A is triggered again setting line 72 low. The restriction circuitry opens the telephone line as explained above.

Second Digit Restriction

If a digit 1 is dialed after a first valid digit has been dialed, the restriction data path of digit 1 is held low by diode $CR_{11}$ and flip-flop U5B, line 512. Thus line 75 to the D input of U5A (FIG. 7) is not affected by a high level on line 42 out of U3.

The digit 0 is still enabled even after a first valid digit has been dialed. When a digit 0 is dialed as the second digit, line 43 goes high and this voltage is applied to line 75 of U5A and the restriction process proceeds as discussed above.

Third Digit Restriction

IF switch S1-10 (FIG. 10) is not closed, a zero dialed as a third digit, will impress a high value on line 43 and restriction proceeds as before. If S1-10 is closed, line 75 is held to a low value by flip-flop U6A line 52 (FIG. 5) through diode $CR_{10}$ (FIG. 6). Line 52 is set to a low value after a second valid digit has been dialed. Also, line 76 is held low at the S input of U5A (FIG. 7) as explained before until three digits have been dialed by line 314 from flip-flop U6B. Hence restriction does not occur if S1-10 is closed and a zero is dialed after two valid digits have been dialed.

Eighth Digit Restriction

If switch $S_{12}$ is open, line 41 of circuit U3 is set high when the eighth digit is dialed. The high voltage is applied through resistors $R_{28}$ and $R_7$ and is applied to the S input of U5A on line 76. Flip-flop U5A responds by setting line 72 low and restriction occurs as before.

Ninth Digit Restriction

If switch S12 is closed, the junction of resistor $R_{28}$ and $R_7$ is held low by line 45 from U3 (FIG. 6) before the ninth digit has been dialed. When the ninth digit is dialed, line 45 is set to a high value, which is applied via switch $S_{12}$, resistor $R_7$ and line 76 to the S input of U5A. Restriction then occurs as before.

Time-Out Restriction

Excessive inter-digital waiting time is prevented through the use of flip-flop U7A shown in FIG. 7. The D input of U7A is controlled by an RC network comprising $R_{24}$, $R_{25}$ and $C_{11}$ having a time constant of about 18 seconds. Line 715 is connected to the D input at the junction of $R_{25}$ and $C_{11}$. After any digit has been dialed, and the negative pulse appearing on line 212 from flip-flop U4A returns to high, the RC network starts charging. If the time between digits dialed is greater than 18 seconds, flip-flop U7A will be triggered on the leading edge of the next positive-going digit pulse from flip-flop U4A on line 213.

When flip-flop U7A is triggered, line 71 out of U7A goes high. The high voltage is impressed across $R_4$ and $CR_{22}$ to line 76 connected to the set input S of flip-flop U5A. If line 76 is held to a low value by the third digit flip-flop U6B (FIG. 5) by line 314, the high level on line 76 remains. Once line 314 goes high, the high level from line 76 through $R_4$ and $CR_{22}$ will not be inhibited. It will set U5A for restriction.

Restriction and Resetting of all Logics

When U5A is set or triggered for restriction, relay CO (FIG. 7) is energized causing relay contacts CO-1 and CO-3 (FIG. 1) in the telephone line tip and ring lines to open. Because of the open circuit in the tip and ring lines, sense amplifier U1A (FIG. 1) starts to generate a logic 1 at its output on line 3. This logical 1 is sensed on line 10 from Exclusive-OR circuit U1C and is applied to reset register U4B by charging through $R_{17}$ to capacitor $C_{10}$ (FIG. 2). After about 470 ms, circuit U4B output line 21 is driven high, resetting all logics of flip-flops U5B, U6A and U6B. About one second later restriction register U5A (FIG. 7) is reset whereby relay CO is de-energized and contacts CO-1 and CO-3 reconnect the "tip" and "ring" lines to reapply dial tone.

Call Transfer Programming

In order to allow certain sets of a plurality of telephone sets to be "unrestricted", the unrestricted telephones are connected to the tip and ring lines between the central office and the toll restrictor circuit. All telephones (restricted and unrestricted) connected to the tip and ring lines will activate the toll restrictor circuit, but only telephones connected after the toll restrictor will be affected by a disconnection by the trunk cutoff relay CO (FIG. 7).

If the trunk cutoff relay CO is triggered from an unrestricted telephone, the relay will remain open for the duration of the call because the unrestricted telephone is connected before the toll restrictor, and the low impedance is maintained during restriction thus preventing resetting of the toll restrictor after approximately one second. It is therefore impossible to transfer a call made from an unrestricted telephone to a restricted telephone. This situation is called "absolute restriction."

If switch S30 is closed (FIG. 7), a conductive path from output line 711 of flip-flop U5A exists through diode $CR_{27}$ and resistor $R_{29}$ to input lead 5 of Exclusive-OR circuit U1B (FIG. 1). If U5A line 711 goes high after a restrictive digit is sensed, a high level voltage is applied to lead 5 of U1B as a forced ON-HOOK condition. This forced ON-HOOK condition will be applied via line 10 to U4B (FIG. 2) which in turn resets all logics including flip-flop U5A. Resetting U5A results in the de-energizing of relay CO, thus closing contacts CO-1 and CO-3 (FIG. 1). The restricted telephone is now connected to the tip and ring lines and the transfer of the outgoing call by the unrestricted telephone to the restricted telephone is possible.

Preferred Circuit

FIG. 8 shows how the previous seven figures are interconnected. The table which follows provides preferred component values for the circuit.

TABLE OF CIRCUIT VALUES

| ITEM | VALUE | PRECISION | SOURCE |
|---|---|---|---|
| $R_1$ | 560 KΩ | | |
| $R_2$ | 560 KΩ | | |
| $C_1$ | .01 μf | | |
| $R_{22}$ | 560 KΩ | | |
| $R_{20}$ | 2.2 MΩ | ± 10% | |
| $R_3$ | 44.2 KΩ | ± 1%, .1w | |
| $R_{27}$ | 100 KΩ | | |
| $C_2$ | .47 μf | ± 10%, 25v | |
| $C_3$ | .47 μf | | |
| U1 (A,B,C,D) | | | RCA-CD4030AE |
| U4 (A & B) | | | RCA-CD4013AE |
| $C_8$ | .47 μf | ± 5% | |
| $R_{16}$ | 560 KΩ | | |
| $C_{10}$ | .47 μf | | |
| $R_{17}$ | 1 MΩ | | |
| $R_{18}$ | 560 KΩ | | |
| $C_9$ | .01 μf | | |
| U2 | | | RCA-CD4019AE |
| U5 | | | RCA-CD4013AE |
| U6 (A & B) | | | RCA-CD4013AE |
| U7 (A & B) | | | RCA-CD4013AE |
| $R_6$ | 560 KΩ | | |
| $R_5$ | 22 KΩ | | |
| $R_{28}$ | 22 KΩ | | |
| $R_7$ | 100 KΩ | | |
| $R_9$ | 560 KΩ | | |
| $R_{10}$ | 22 KΩ | | |
| $R_{19}$ | 100 KΩ | | |
| $R_8$ | 1 MΩ | | |
| $C_4$ | .01 μf | | |
| $R_{23}$ | 22 KΩ | | |
| $C_5$ | .47 μf | ± 5% | |
| $R_{11}$ | 2.2 MΩ | ± 10% | |
| $R_{12}$ | 22 KΩ | | |
| $R_{26}$ | 22 KΩ | | |
| $R_{24}$ | 1 MΩ | | |
| $R_{25}$ | 1 MΩ | | |
| $R_{29}$ | 1.2 KΩ | | |
| $C_{11}$ | 10 μf | ± 20%, 50v | |
| $R_4$ | 10 KΩ | | |
| CR 15,16 25,26 | | | Diode IN 4002 |
| CR 1–14, 18–24, | | | Diode IN 4128 |

TABLE OF CIRCUIT VALUES-continued

| ITEM | VALUE | PRECISION | SOURCE |
|---|---|---|---|
| 27,28 $Q_{2,3}$ | Transistor, PNP (2N2907) | | |
| CO | Relay, 4E8M (OK 1 No. REC 31630B) | | |

What is claimed is:

1. Toll restricting apparatus to prohibit toll telephone calls from being made on a restricted telephone instrument providing loop disconnect outputs, said instrument being connected to a central office by means of tip and ring signal path leads, said toll restricting apparatus being connected to said tip and ring signal path leads at a point between said central office and said instrument, said apparatus comprising,
   sensing means responsive to signaling and dialing pulses on said tip and ring leads for generating sensing signals,
   first counting means responsive to said sensing signals for counting the number of digits dialed and generating a first restrict signal, if said number of digits dialed is greater than a first predetermined number of digits,
   second counting means responsive to said sensing signals for counting the number of dialing pulses for each digit dialed up to a second predetermined number of digits, and generating a second restrict signal, if said number of dialing pulses for any of said digits up to said second predetermined number of digits dialed is equal to predetermined number of pulses,
   means for generating inhibiting signals indicating that predetermined absorb digits have been dialed before a non-absorb digit has been dialed,
   inhibiting means responsive to said inhibiting signals for inhibiting said first counting means from beginning a digit count and for inhibiting said second counting means from beginning digit pulse counting until a non-absorb digit has been dialed, and
   means responsive to said first or second restrict signals for opening said tip and ring signal path.

2. The apparatus of claim 1 further comprising resetting means for resetting first and second counting means to zero and closing said tip and ring signal path after which central office dial tone appears on said tip and ring leads.

3. The apparatus of claim 1 wherein said first predetermined number of digits is seven.

4. The apparatus of claim 1 wherein said first predetermined number of digits is eight.

5. The apparatus of claim 1 wherein said second predetermined number of digits is three, and said predetermined number of pulses is 10 or one for the first digit dialed and ten for the second digit dialed.

6. The apparatus of claim 1 wherein said second predetermined number of digits is three, and said predetermined number of pulses is ten and one for the first digit dialed and ten for the second and third digits dialed.

7. Toll restricting apparatus to prohibit toll telephone calls from being made on a restricted telephone instrument providing loop disconnect outputs, said instrument being connected to a central office by means of tip and ring signal path leads, said toll restricting apparatus being connected to said tip and ring signal path leads at a point between said central office and said instrument, said apparatus comprising, sensing means responsive to signaling and dialing pulses on said tip and ring leads for generating sensing signals, first counting means responsive to said sensing signals for counting the number of digits dialed up to a first predetermined number of digits and generating a first count signal after said first predetermined number of digits has been dialed, second counting means responsive to said sensing signals for counting the number of dialing pulses for each digit dialed for said first predetermined number of digits, said second counting means generating a restrict signal if a restricted number of dialing pulses has been dialed for any digit up to and including said first predetermined number of digits, means responsive to said first count signal for converting said second counting means into a digit pulse counter for counting the number of digits dialed after said first predetermined number of digits have been dialed, said digit pulse counter generating a restrict signal if the total number of digits dialed is greater than a second predetermined number of digits, and means responsive to said first or second restrict signals for opening said tip and ring signal path.

8. The apparatus of claim 7 further comprising resetting means for resetting first and second counting means to zero count and closing said tip and ring signal path after which central office dial tone appears on said tip and ring leads.

9. The apparatus of claim 7 further comprising, second counting means further comprising, means for generating inhibiting signals indicating predetermined absorb digits have been dialed before a non-absorb digit has been dialed, and inhibiting means responsive to said inhibiting signals for inhibiting the counting of digits dialed by said first counting means.

10. The apparatus of claim 9 wherein said second counting means generates a restrict signal if a 0 is dialed as the first or the second non-absorb digit.

11. The apparatus of claim 9 wherein said second counting means generates a restrict signal if a 0 is dialed as the first, second or third non-absorb digit.

12. The apparatus of claim 9 wherein said second counting means generates a restrict signal if a 1 is dialed as the first non-absorb digit.

13. The apparatus of claim 7 wherein said first predetermined number of digits is 3.

14. The apparatus of claim 7 wherein said second predetermined number of digits is 7.

15. The apparatus of claim 7 wherein said second predetermined number of digits is 8.

16. The apparatus of claim 8 further comprising means for resetting said first and second counting means to zero count and closing said tip and ring signal path if an unrestricted telephone set is connected to said tip and ring leads between the central office and the toll restricting apparatus.

17. The apparatus of claim 7 further comprising means for opening said tip and ring signal path, when after a first digit or subsequent digit has been dialed, a time interval exceeding a predetermined time interval occurs before a succeeding digit is dialed.

18. The apparatus of claim 17 wherein said predetermined time interval is 18 seconds.

19. The apparatus of claim 7 wherein said telephone instrument is a rotary dial telephone set.

20. The method of prohibiting toll telephone calls from a restricted telephone instrument providing loop disconnect outputs connected to a central office by means of tip and ring signal path leads comprising the steps of, sensing dialing pulses on said tip and ring leads, inhibiting the counting of the number of digits dialed until a digit is dialed which is not a predetermined absorb digit, counting the number of digits dialed after a first predetermined absorb digit has been dialed, counting the number of dialing pulses for each digit dialed for a first predetermined number of digits, opening said tip and ring signal path on said tip and ring signal path when a restricted digit is dialed among said first predetermined number of digits, and opening said tip and ring signal path when the total number of digits dialed is greater than a second predetermined number of digits.

21. The method of claim 20 further comprising the step of opening said tip and ring signal path, when after a first or subsequent digit has been dialed, a time interval exceeding a predetermined time interval occurs before a succeeding digit is dialed.

22. The method of claim 20 further comprising the step of closing said tip and ring signal path after which central office dial tone appears on said tip and ring leads.

* * * * *

UNITED STATES PATENT AND TRADEMARK OFFICE
CERTIFICATE OF CORRECTION

PATENT NO. : 3,980,836
DATED : September 14, 1976
INVENTOR(S) : Richard Lik-Chuen Chan It is certified that error appears in the above-identified patent and that said Letters Patent are hereby corrected as shown below:

Col. 6, line 22 - change "the" second occurrence, to --a--.

Col. 6, line 28 - change "70ms" to --470ms--.

Col. 6, line 51 - between "$A_2$" and "receives" insert --input--.

Signed and Sealed this

Eighteenth Day of January 1977

[SEAL]

Attest:

RUTH C. MASON
Attesting Officer

C. MARSHALL DANN
Commissioner of Patents and Trademarks